United States Patent [19]
Ferrari

[11] 3,804,108
[45] Apr. 16, 1974

[54] APPARATUS FOR THE SELECTIVE DISPENSING OF A LIQUID AND A GAS

[75] Inventor: Christopher Ferrari, Weston, Mass.

[73] Assignee: Damon Corporation, Needham Heights, Mass.

[22] Filed: Oct. 20, 1972

[21] Appl. No.: 299,350

[52] U.S. Cl............... 137/112, 23/253 A, 137/154
[51] Int. Cl............................................. F16k 19/00
[58] Field of Search................ 137/112, 154, 607; 73/423 A; 23/230 A, 253 A; 222/53, 61; 302/41

[56] References Cited
UNITED STATES PATENTS

| | | | |
|---|---|---|---|
| 3,654,959 | 4/1972 | Kassel | 137/154 X |
| 3,463,179 | 8/1969 | Hrdina | 137/154 |
| 3,695,281 | 10/1972 | Leon | 137/154 |
| 3,550,612 | 12/1970 | Maxon | 137/112 |

FOREIGN PATENTS OR APPLICATIONS

| | | | |
|---|---|---|---|
| 617,985 | 8/1935 | Germany | 302/41 |

Primary Examiner—Robert G. Nilson
Attorney, Agent, or Firm—Kenway, Jenney & Hildreth

[57] ABSTRACT

Apparatus for the selective dispensing of a liquid has a conduit junction having a single output branch and which selectively receives the liquid under pressure at a liquid input branch and a gas under pressure at a gas input branch. Valve means apply either the gas or the liquid to the conduit junction, which has a chamber forming a common fluid-passage between the two input and single output branches. The conduit junction maintains a stable interface between the input fluid being transferred to the output branch and the other input fluid, so that the liquid is dispensed only when specified, and then with minimal inclusion of the gas, thereby making possible the accurate and precise dispensing of the liquid.

20 Claims, 6 Drawing Figures

APPARATUS FOR THE SELECTIVE DISPENSING OF A LIQUID AND A GAS

BACKGROUND OF THE INVENTION

This invention relates in general to apparatus for dispensing a liquid and a gas, one at a time, at a single common output conduit with minimal inclusion of either fluid in the other. This operation enables either or both fluids to be dispensed exclusive of the other in accurately and precisely measured volumes.

The invention further provides a fluid conduit junction for transferring either a liquid or a gas input to it in separate branches to a common output branch. The junction makes possible, on a uniformly repeatable basis, a sharp transition to the initiation of liquid dispensing and a sharp termination of liquid dispensing operation. Also, it maintains a stable interface between the fluid being passed and the other fluid.

The dispensing apparatus is useful, for example, in an automated instrument for the constituent analysis of a biological fluid sample, such as blood serum. In such an instrument, different chemicals reagents are mixed with different aliquots of the sample. Accurate and precise performance of the instrument requires that a specified volume of each reagent be dispensed for mixture with a sample aliquot. Both an error in the volume of a dispensed reagent, and an inconsistency in successively dispensed volumes, are undesirable, because either produces an error in the constituent analysis.

The practical requirements for such an analysis instrument call for dispensing apparatus that is relatively low in cost and that operates reliably without operator attention. Further, the apparatus should dispense the desired volume of each reagent in a brief time, so that the analysis instrument can process a large number of fluid samples per hour.

Although the foregoing fluid dispensing application requires only that the selected reagent be dispensed, it has been found desirable for rapid and accurate reagent dispensing to drive the measured volume of reagent out of the dispenser output conduit, and to clear the reagent from the output conduit, by blowing air or another gas through the conduit. Accordingly, dispenser apparatus meeting the requirements of a constituent analysis instrument and like equipments must, in effect, dispense either of two fluids, the desired reagent and the gas.

For clarity, this invention is described below with principal reference to its application in dispensing a liquid reagent in a constituent analysis instrument, but the scope and utility of the invention are not so limited.

An object of the invention is to provide apparatus for dispensing a succession of measured volumes of a liquid and characterized by high accuracy and precision of the dispensed volumes.

Another object of the invention is to provide a dispenser of the above character which delivers each volume of liquid under pressure by a gas and with minimal inclusion of the pressuring gas.

A further object of the invention is to provide dispensing apparatus of the above character capable of automated, operator-free operation.

It is also an object of the invention to provide apparatus for dispensing successive measured volumes of either one of two nonmiscible fluids, one at a time at a common output conduit with minimal inclusion of the other.

A further object of the invention is to provide fluid dispensing apparatus of the above character that dispenses a liquid under pressure by a gas and which operates with a sharp transition to and from the dispensing of a measured volume of the liquid.

It is also an object of the invention to provide a three-branch conduit junction for transferring either a gas or a liquid, applied to different input branches thereto, to a single output branch thereof with a stable undisturbed interface between the fluid being passed and the other fluid.

Other objects of the invention will in part be obvious and will in part appear hereinafter.

SUMMARY OF THE INVENTION

A liquid dispenser embodying the invention has a conduit junction with a chamber into which two input branches and an output branch feed and which forms a common fluid passage between the three branches. Means are provided for applying the liquid to a first input branch under pressure and for applying air or another pressuring gas to the other input branch. A valve unit connected with the input branches either applies the liquid to the chamber and blocks the gas, in which case the junction transfers the liquid to the output branch, or applies the gas to the chamber and blocks the liquid, in which case the junction transfers the gas to the output branch to discharge the liquid previously metered into the output branch.

The conduit junction responds to a switching of the input fluids by the valve unit to develop a relatively sharp transition between the input fluid being transferred to the output branch thereof to the other fluid. Further, the conduit junction maintains a stable interface between the fluid being passed therethrough and the other fluid. This operation enables the dispenser to deliver the liquid to the output branch in a single segment essentially free of inclusions of the pressuring gas and without droplets at either end of the segment. This in turn makes it possible to meter the volume of the liquid, and/or of the gas, being dispensed with high accuracy and high precision.

Structural features of the conduit junction that contribute to the foregoing operation include the use of branches of small bore to minimize the fluid volume within the junction, and an output branch bore that is no greater than the bore in either input branch. Also, the liquid input branch enters the junction chamber from below. This bottom infeed of the liquid branch precludes gravitational feeding of liquid to the junction chamber.

The chamber of the conduit junction has a cross-sectional area at least as large as, and usually larger than, the largest input branch bore. Further, the chamber walls are contoured to support a stable liquid meniscus, or liquid-gas interface, both during the transition between the transfer of one input fluid to the output branch to the transfer of the other input fluid, and continuously during the transfer of liquid to the output. The chamber further provides a relatively open passage between the gas inlet branch and the outlet branch for passage of gas through the junction and particularly through the chamber with minimal tendency for the entrainment therein of liquid from the meniscus at the liquid input branch.

The conduit junction in one embodiment has the gas inlet branch and the outlet branch substantially in line with each other at opposite sides of the junction chamber. This embodiment further has an outwardly bulging concave chamber wall along its upper surface, which extends between the gas input and output branches and is opposite the entry into the chamber of the liquid input branch. It further has been found desirable to incline the output branch slightly upwards.

The invention accordingly comprises the features of construction, combinations of elements and arrangement of parts exemplified in the constructions hereinafter set forth, and the scope of the invention is indicated in the claims.

BRIEF DESCRIPTION OF DRAWINGS

For a fuller understanding of the nature and objects of the invention, reference should be made to the following detailed description and the accompanying drawings, in which.

DESCRIPTION OF ILLUSTRATED EMBODIMENTS

Figure 1:
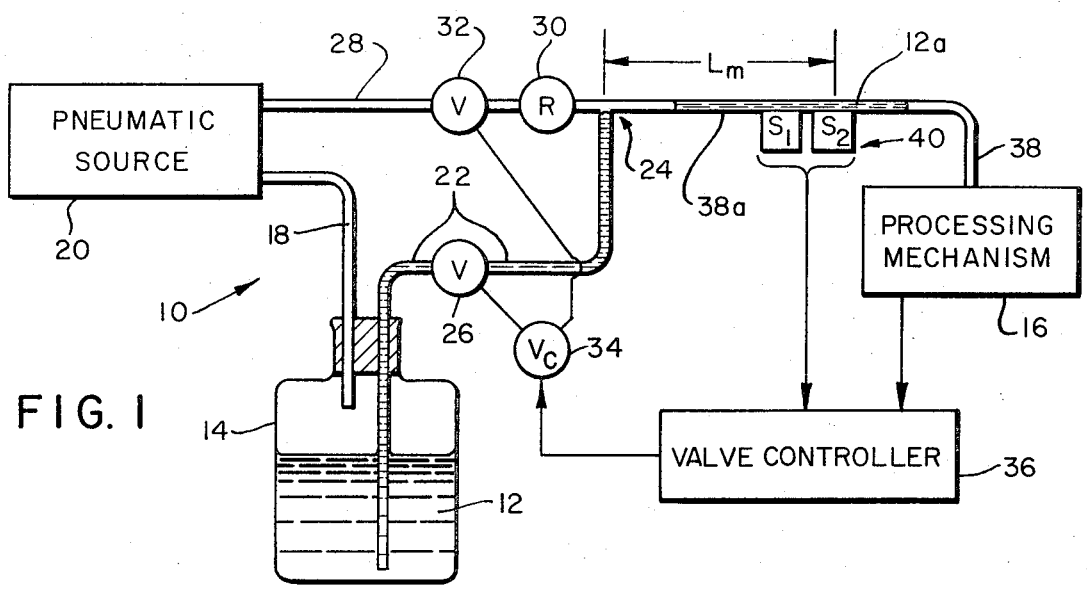
FIG. 1 is a schematic representation of dispensing apparatus embodying the invention.

The dispensing system 10 of FIG. 1 delivers measured volumes, such as volume 12a, of a chemical reagent liquid 12 from a reservoir 14 at selected times to a processing mechanism 16, which may for example be a constituent analysis instrument of the type discussed above. The reservoir 14, diagrammatically shown as a flask sealed closed with a two-hole stopper, receives a pressuring gas, typically air, by way of conduit 18 from a regulated pneumatic source 20. A liquid discharge conduit 22 feeds reagent liquid from the bottom of reservoir 14, as indicated, to a conduit junction 24. A liquid valve 26 is connected in series in the conduit 22 for selectively passing the reagent liquid 12 and, alternatively, blocking it.

Also input to the conduit junction 24 is an air conduit 28 that receives air or other gas under pressure from the source 20. In series in the air conduit 28 is a pressure dropping restrictor 30, and an air valve 32 that selectively either feeds the pressuring air to the conduit junction or blocks it.

The illustrated dispensing system operates the valves 26 and 32 in a flip-flop manner so that they are in opposite conditions, i.e., one is closed when the other is open and vice-versa, by means of a control valve 34 and a valve controller 36. In the specific embodiment illustrated, the valves 26 and 32 are diaphragm valves, and the control valve 34 receives air under pressure from the source 20 (via a conduit not shown) and directs it to one or the other of the valves 26, 32, thereby closing one of these valves and allowing the other one to open. Other valving and valve control arrangements can of course be provided with the conventional skills.

With further reference to FIG. 1, the output conduit 38 of the dispensing system, which leads from the junction 24 to the processing mechanism 16, has an initial section 38a, designated as a metering length ($L_m$), which contains a measured volume of fluid between the intersection of the conduits 22 and 28 at the junction 24 and a sensing location, where a fluidic sensing unit 40 is located. The sensing unit, illustrated as a pair of conductivity sensors, produces a signal that is applied to the valve controller 36 when the fluid in conduit 38 at the sensing location changes from air to liquid 12.

In one sequence of operation of the dispensing system 10, assume that the air valve 32 is open and the reagent valve 26 closed, so that a stream of air from source 20 is flowing through conduit 28, the open valve 32, restrictor 30, and the junction 24 to the output conduit 38, from which it is vented or otherwise discharged at the processing mechanism 16. If the system had previously delivered a volume of reagent liquid 12 to the processing mechanism, the conduit 22 leading from reservoir 14 to the junction 24 would be full of the liquid, as illustrated. Hence there is a reagent-air interface within the junction 24. However, the stream of air passing by this interface does not strip off and pick up droplets or particles of the reagent liquid; instead the stream of air passes through the junction free of the reagent liquid, as is desired.

When the processing mechanism signals the valve controller 36 to deliver reagent liquid to it, the valve controller operates the control valve 34 to reverse the positions of the valves 26 and 32, thereby closing valve 32 and opening valve 26. Upon the opening of valve 26, the pressure within the reservoir 14 acting on the reagent liquid discharges the liquid 12 from the conduit 22 at the junction 24 and into the output conduit 38. However, as soon as the metering length of conduit 38 is full of liquid, i.e., when the leading edge of the liquid segment reaches the measuring location, the sensing unit responds by signaling the valve controller 36 to again reverse the positions of the valves 26 and 32. This action terminates the delivery of reagent to the output conduit 38 and resumes the delivery of air to it, which drives the measured volume 12a of reagent liquid along the output conduit 38 to the processing mechanism.

The gas restrictor 30, preferably connected between the valve 32 and the junction 24 as illustrated, functions to deliver gas to the junction 24 with a velocity that is largely independent of the nature and volume of the liquid in the output conduit 38. The resultant uniform gas velocity produces a smooth and even discharge of liquid from the conduit 38 to the processing mechanism 16. It is also considered to contribute to the development of a sharp transition in the junction between the transfer of liquid to the output branch to the transfer of gas.

Thus, the restrictor 30, which can simply be a coiled length of small-bore tubing, ensures that the velocity of the air stream through the junction 24 remains below the value at which it would strip off liquid, particularly when the pressure head resisting the air stream drops as occurs when a measured liquid volume 12a is driven out of the output conduit 38.

By way of illustration, a dispensing system of the type shown in FIG. 1 and having a one millimeter bore in the conduits 28 and 38 and a two millimeter bore in the liquid carrying conduit 22, employs a pneumatic source 20 that applies a constant regulated pressure of about 2.25 psi to the air conduit 28 and applies to the reagent pressuring conduit 18 a regulated air pressure of between 2.25 and 5 psi, depending on the properties of the particular reagent liquid being dispensed. The dispenser meters reagent volumes as small as 60 lambda ($1 \times 10^{-6}$ liter), and yet can meter a reagent volume of 2,000 lambda or more, and in the same time if desired.

Figure 2:
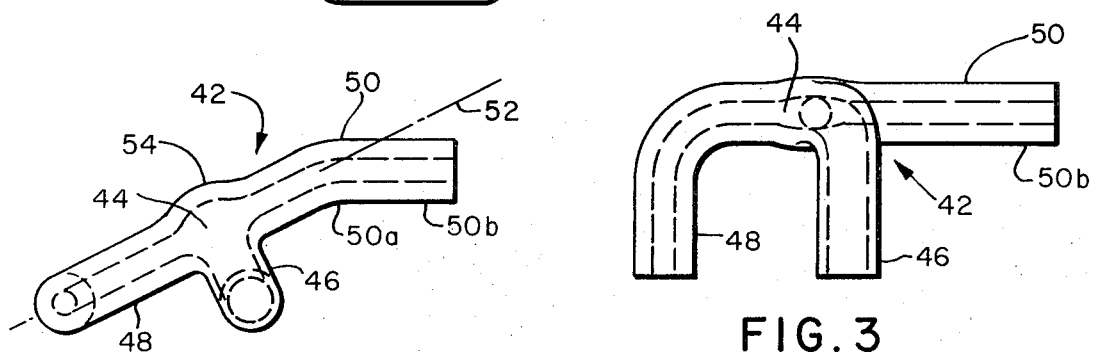
FIGS. 2 and 3 are, respectively, side elevation and top plan views of a conduit junction for use in the apparatus of FIG. 1 and embodying features of the invention.
Figure 3:
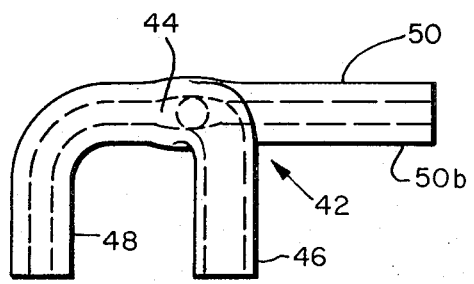

FIGS. 2 and 3 show a conduit junction 42 for use as the junction 24 in the system 10 of FIG. 1. The junction 42 has a chamber 44 into which feed a liquid input branch 46, a gas input branch 48 and an output branch 50. The chamber forms a common fluid passage or juncture between the three conduit branches. FIGS. 2 and 3 show the preferred orientation of the junction 42 in use, FIG. 2 being a side elevation view and FIG. 3 a top view. The air input branch extends from the chamber along an axis 52 inclined relative to the horizontal. The illustrated incline is 27 degrees, and although other angles can be used with substantially equal performance, an incline in the order of 15° to 30° is considered preferable to a horizontal orientation of the output branch.

In the illustrated junction, the air input conduit 48 enters the chamber opposite to and in-line with the output conduit. This orientation enables the junction to transfer the air stream to the output branch with minimal turbulence in the chamber.

The liquid input branch 46 enters the underside of chamber 44 and at right angles to the axis 52 and hence to the air input and the output branches, as shown. This bottom entry of the liquid input branch to the junction chamber is preferable because it allows gravitational forces to retain liquid in the branch 46, except when being pressured into the chamber, as when valve 26, FIG. 1, is open.

The illustrated conduit junction 42 also has a bend 50a in the output branch 50 to orient a terminal section 50b horizontally when the junction is in the proper orientation, FIG. 2. This facilitates alignment of the junction, for manual, visual alignment of the section 50b to the horizontal is usually sufficient to align the junction with axis 52 at the desired incline.

With further reference to FIGS. 2 and 3, the chamber 44 has an outwardly bulging concave wall 54 forming its top or uppermost side, and hence opposite the entry of the liquid inlet branch 46. With this concave wall 54, the chamber has a bulbous top or dome and has a cross-sectional area, in a plane transverse to the planes of both FIGS. 2 and 3, larger than the bore or other transverse cross-sectional area of either branch 46, 48 or 50 at the entry of that branch into the chamber. The preferred configuration of the concave wall 54, as illustrated, is that it extends along the axis 52, between the air input and the output branches, for a distance longer than, and centered on, the inside diameter of the liquid input branch 46. In the aforementioned construction where the branch 46 inside diameter is 2 millimeters, the length of the wall 54 in the plane of FIG. 2 is 5 millimeters. Further, the curvature of the wall 54 is relatively small so that the transition of the tubing walls in the junction 42, between the chamber and the gas inlet and the outlet branches, is smooth and gradual.

The conduit junction 42 structure illustrated in FIGS. 2 and 3 transfers liquid from the input branch 46 to the output branch essentially free of gas bubbles, and, when the FIG. 1 valves 26 and 32 are reversed, transfers gas from the other input branch 48 to the output branch without any liquid particles becoming entrained in the flowing gas. Further, the junction, including the chamber, is structured to provide a clean transition between these two conditions. The junction provides this operation for a variety of liquids, so that a single construction can be used to dispense each of them.

To provide this operation, the conduit junction supports an interface between the gas and the liquid which is stable, particularly during both the initiation and the termination of the liquid transfer to the output branch, and during the transfer of gas to the output branch. The manner in which the construction of the invention is understood to attain these ends is now discussed with reference to FIGS. 4 and 5.

Figure 4:
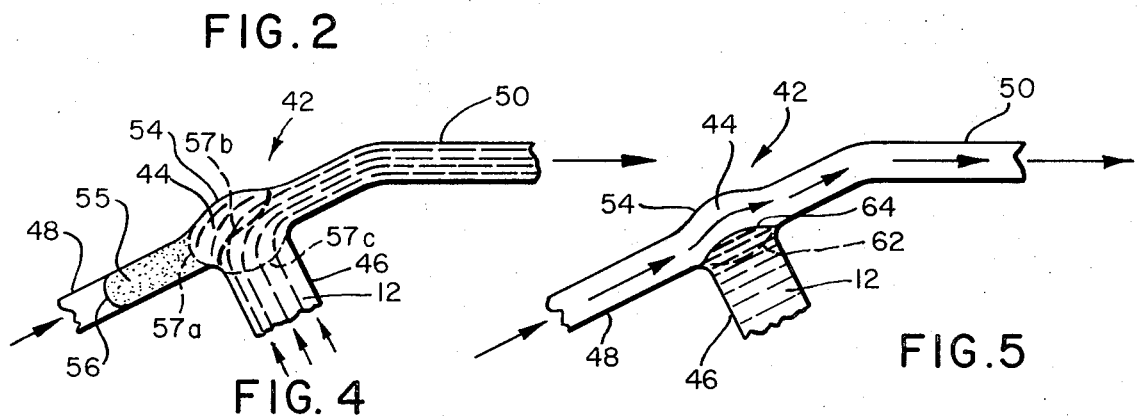
FIG. 4 is a pictorial representation of the operation of a conduit junction in accordance with the invention during the dispensing of liquid.

FIG. 4 illustrates the operation of the junction 42, in a dispensing system such as in FIG. 1, when gas is blocked from inlet branch 48 and liquid is applied under pressure to inlet branch 46. As illustrated, the liquid flows from the inlet branch 46 through the chamber 44 to the outlet branch 50. As also shown, the pressure in reservoir 14 (FIG. 1) acting on the liquid presses a small but finite volume 55 of the reagent liquid backward from the chamber 44 into the gas input branch. The liquid volume 55 extends into the branch 48 until it compresses the air therein to balance the pressure from reservoir 14 acting on the liquid. Hence, the internal volume of the branch 48 section between the valve 32 (FIG. 1) and the chamber, and the restrictor 30 in this section, can be selected to adjust the magnitude of the liquid volume 55, which preferably is made small as FIG. 4 indicates.

The entry of liquid into the gas input branch develops the gas-liquid interface at the liquid meniscus 56 within the branch 48. The liquid volume 55 thus provides a barrier between the gas in input branch 48 and the output branch, and hence essentially precludes gas from entering the output branch during the transfer of liquid to it, as desired.

During the termination of liquid dispensing, i.e., when the delivery of liquid to junction 42 stops and the air delivery is resumed, the liquid-gas interface moves along the gas input branch from the meniscus 56 to the position 57a. The interface then converges onto the entry of the liquid branch to the chamber, through an intermediate position 57b and then to a final position 57c, as the air progressively clears liquid within the chamber into the output branch.

The transition interfaces at positions 57a and 57b, and the interface at position 57c, which the junction 42 provides follow naturally-occurring interface contours and hence tend to be stable, so that no air bubbles break through the interface into the output branch. Further, the chamber 44 geometry, and the spatial distributions of the entries of the branches thereinto are such that only a single interface develops; i.e., droplets of liquid do not tend to "break out" from the interface and adhere to the chamber walls, from where they would subsequently be stripped into the ensuring air stream. In addition, the upward incline of the output branch 50 from the chamber, together with the bottom-side entry of the liquid branch 46, have been found to enhance the interface to essentially "snap" from intermediate position 57b to the final position 57c, again without air bubbles breaking through into the output branch. (It should be noted that whereas the liquid illustrated in FIG. 4 forms a concave meniscus, i.e., meniscus 57c, the junction 42 can equally well be used with liquids that tend to form a convex meniscus.)

During the initiation of the dispensing of liquid, the junction 42 supports a transition of the liquid-gas interface in essentially the reverse mirror-image sequence from that described above. That is, with further reference to FIG. 4, the interface typically is initially at position 57c. Upon the opening of the liquid valve and the closure of the gas valve, the volume 55 of liquid flows into gas branch 48. The liquid then fills the chamber upwardly, after which the junction begins to transfer liquid to the output branch.

Figure 5:
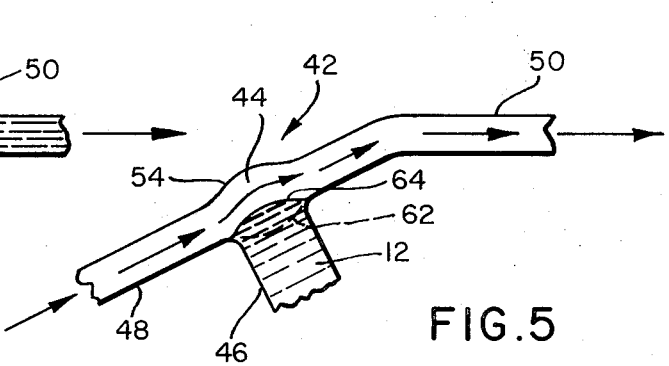
FIG. 5 is a pictorial representation of the operation of a conduit junction embodying the invention during the passage therethrough of gas.

Turning to FIG. 5, during the blockage of liquid from the output branch 50 as there illustrated, the junction chamber 44 again maintains a stable interface, but now between the flowing gas and the blocked liquid. When the blocked liquid has a concave meniscus 62, whether due to the properties of the liquid and/or a slightly increased pressure within the chamber 44, this meniscus is removed from the chamber and there is little likelihood for the flowing air to strip off particles of liquid and carrying them into the output branch.

On the other hand, when the liquid has a convex meniscus 64 as tneds to occur with some liquids and with, for example, a slowly leaking liquid valve (e.g., valve 26 in FIG. 1) the flowing air exerts shear forces on the liquid at the meniscus interface. These forces tend to carry liquid particles into the output branch, which is not desired. However, the concave chamber wall 54 allows the flowing air to bypass the convex interface of meniscus 64, and thereby reduces the gas force tending to strip off liquid. In other words, the bulbous domed chamber 44 accommodates a significant accretion of liquid during the passage of air without allowing the liquid to pinch off the air flow or to be stripped into the output branch.

The incline of the output branch 50 along the axis 52 (FIG. 2) also comes into play during the passage of gas through the conduit junction as shown in FIG. 5 by virtue of the gravitational impediment it places on the introduction of liquid into the output branch.

Figure 6:
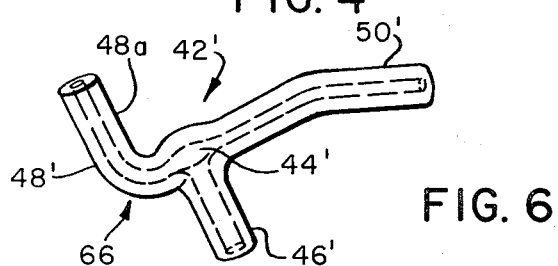
FIG. 6 is a perspective view of a modification of the conduit junction of FIGS. 2 and 3 in accordance with the invention.

FIG. 6 shows a conduit junction 42' similar to the junction 42 described above with reference to FIGS. 2 through 5, except that the liquid inlet conduit 46' is straight, which is a matter of choice, and that the gas inlet branch 48' has an upwardly directed terminal section 48a extending from an elbow 66 that is closely adjacent but below the chamber 44'. (The FIG. 6 junction and the elements thereof common to the junction 42 of FIG. 2 bear the same reference numeral as in FIG. 2 plus a terminal prime.)

The elbow 66 and the terminal section 48a extending upwardly therefrom form a liquid trap that blocks liquid, and dense vapors of the liquid, from entering further into the gas inlet branch 48'.

It will thus be seen that the objects set forth above, among those made apparent from the preceding description, are efficiently attained. As a specific example, a reagent dispenser embodying the invention in the manner described above with reference to FIGS. 1 and 2 can dispense with accuracy and precision reagent liquids having viscosities on the one hand at least as small as water and, on the other hand, at least 25 times more viscous than water.

The conduit junctions of the invention as described above can be fabricated with conventional skills of glass material customarily used for laboratory and instrument purposes.

Since changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Apparatus for the selective dispensing of a liquid, said apparatus comprising, in combination,
    A. a conduit junction having a liquid input branch, a gas input branch, and an output branch,
    B. first means communicating with said liquid input branch for applying said liquid thereto under pressure,
    C. second means communicating with said gas input branch for applying said gas thereto under pressure,
    D. valve means connected for selectively
        1. passing said liquid to said liquid inlet branch and alternatively blocking said liquid from said liquid inlet branch, and
        2. passing said gas to said gas inlet branch and alternatively blocking said gas from said gas inlet branch,
    E. control means operating said valve means selectively to
        1. block said liquid and pass said gas so that said conduit junction transfers only said gas to said output branch, and
        2. alternatively to pass said liquid and block said gas so that said junction transfers only said liquid to said output branch, and
    F. a pressure source supplying the same pressure to both said first and said second pressure application means.

2. Dispenser apparatus as defined in claim 1 further characterized in that said control means includes sensor means responsive to the volume of liquid transferred to said output branch for signaling said control means to effect said operation of said valve means.

3. Dispenser apparatus as defined in claim 1 further characterized in that
    A. said valve means has a first condition in which it passes said liquid to said liquid inlet branch and blocks said gas from said gas inlet branch, and alternatively has a second condition in which it blocks said liquid from said liquid inlet branch and passes said gas to said gas inlet branch, and
    B. said control means operates said valve means to switch from said first condition to said second condition in response to the volume of liquid transferred to said output branch.

4. Dispensing apparatus as defined in claim 1 further comprising a fluid restrictor connected in fluid communication between said second means and said gas input branch for restricting the velocity of gas through said junction when said valve means is passing gas to said gas inlet branch.

5. Dispenser apparatus as defined in claim 1 further characterized in that the cross-sectional area of said output branch is not greater than the cross-sectional area of either input branch.

6. Apparatus for the selective dispensing of a liquid, said apparatus comprising, in combination,
   A. a conduit junction having a liquid input branch, a gas input branch, an output branch, and a chamber connecting with said input and output branches and providing a common fluid passage therebetween, said chamber having an outwardly bulging concave wall which enlarges the interior cross-sectional area of said chamber to a value greater than the cross-sectional area of each said branch at the entry thereinto,
   B. first means communicating with said liquid input branch for applying said liquid thereto under pressure,
   C. second means communicating with said gas input branch for applying said gas thereto under pressure,
   D. valve means connected for selectively
      1 passing said liquid to said liquid inlet branch and alternatively blocking said liquid from said liquid inlet branch, and
      2 passing said gas to said gas inlet branch and alternatively blocking said gas from said gas inlet branch, and
   E. control means operating said valve means selectively to
      1. block said liquid and pass said gas so that said conduit junction transfers only said gas to said output branch, and
      2. alternatively to pass said liquid and block said gas so that said junction transfers only said liquid to said output branch 7. Dispensing apparatus as defined in claim 6 further characterized in that said liquid input branch feeds into said chamber at the underside thereof.

8. Dispensing apparatus as defined in claim 6 further characterized in that said liquid input branch and said gas input branch feed into said chamber substantially transversely to each other.

9. Dispensing apparatus as defined in claim 8 further characterized in that said gas input branch and said output branch feed into said chamber substantially in line with each other.

10. Dispensing apparatus as defined in claim 6 further characterized in that one said branch feeds into said chamber substantially orthogonally relative to a second said branch and substantially in line relative to the third said branch.

11. Dispensing apparatus as defined in claim 6 further characterized in that said outwardly bulging concave wall is opposite the entry into said chamber of said liquid input branch at the underside of said chamber.

12. Dispensing apparatus as defined in claim 11 further characterized in that said gas input branch feeds into said chamber along a direction transverse to the entry thereinto of said liquid input branch.

13. Dispensing apparatus as defined in claim 11 further characterized in that said output branch feeds into said chamber along a direction transverse to said liquid input branch at the entry thereof into said chamber and extends from said chamber at an incline relative to the horizontal.

14. Dispensing apparatus as defined in claim 13 further characterized in that said gas input branch enters said chamber along a direction substantially opposite to and in line with the entry of said output branch.

15. Dispensing apparatus as defined in claim 6 further characterized in that said gas input branch has a trap-forming bend located below said chamber.

16. Dispensing apparatus as defined in claim 6 further characterized in that the cross-sectional area of said output branch is not greater than the cross-sectional area of either input branch.

17. Dispensing apparatus as defined in claim 6 further characterized in that said chamber has walls contoured for supporting therein a single liquid-gas interface converging toward the entry of said liquid inlet branch into said chamber, during the transition from the transfer of liquid to said output branch to the transfer of gas.

18. Dispensing apparatus as defined in claim 6 further characterized in that said gas input branch feeds into said chamber at the upperside thereof.

19. Dispensing apparatus as defined in claim 18 further characterized in that said chamber has rounded interior walls forming a smooth transition between said gas input branch and said output branch.

20. Dispensing apparatus as defined in claim 19 further characterized in that
   A. the bore of said liquid input branch is greater than the bore of either other branch, and
   B. the bore of said gas input branch is not less than the bore of said output branch.

* * * * *